US006739476B2

(12) United States Patent
Shigeyama et al.

(10) Patent No.: US 6,739,476 B2
(45) Date of Patent: May 25, 2004

(54) AMPOULE STORAGE CONTAINER

(75) Inventors: Yasuhiro Shigeyama, Toyonaka (JP); Hiroyuki Yuyama, Toyonaka (JP); Tsuyoshi Kodama, Toyonaka (JP)

(73) Assignee: Yuyama Mfg. Co., Ltd., Osaka-fu (JP)

( * ) Notice: Subject to any disclaimer, the term of this patent is extended or adjusted under 35 U.S.C. 154(b) by 15 days.

(21) Appl. No.: 10/289,408

(22) Filed: Nov. 7, 2002

(65) Prior Publication Data

US 2003/0089085 A1 May 15, 2003

(30) Foreign Application Priority Data

Nov. 9, 2001 (JP) ....................................... 2001-344438
Dec. 3, 2001 (JP) ....................................... 2001-368859

(51) Int. Cl.[7] ................................................ B23Q 7/12
(52) U.S. Cl. ....................................... 221/172; 198/416
(58) Field of Search ................................ 221/172, 171, 221/173, 167, 156, 163, 253; 198/416

(56) References Cited

U.S. PATENT DOCUMENTS 3,332,531 A * 7/1967 Chaney ...................... 198/416
4,413,556 A * 11/1983 Ackley ........................ 101/40

FOREIGN PATENT DOCUMENTS

JP 10-192369 7/1998

* cited by examiner

*Primary Examiner*—Kenneth W. Noland
(74) *Attorney, Agent, or Firm*—Wenderoth, Lind & Ponack, L.L.P.

(57) ABSTRACT

An ampoule storage container 1 stores a plurality of ampoules 2 in a laterally orientated state with respect to a discharge direction. A belt conveyor 5 is disposed at the bottom of the ampoule storage container 1 so that the ampoule 2 can be conveyed in the laterally orientated state. An ampoule regulating member 10 is disposed above the belt 6 of the belt conveyor 5 to form a gap through which only one of the ampoule 2 can pass. A stopper 13 which comes into contact with the one end of the ampoule 2 passing through the gap is provided so that the ampoule 2 can be changed to a longitudinally orientated state. According to the present invention, the direction of the ampoule 2 can be changed and a desired number of ampoules 2 can be discharged one by one in spite of simple construction.

11 Claims, 8 Drawing Sheets

(a)

(b)

(a)

(b)

AMPOULE STORAGE CONTAINER

BACKGROUND OF THE INVENTION

The present invention relates to an ampoule storage container in which a plurality of ampoules are stored and a desired number of ampoules can be automatically discharged if necessary.

Conventionally, as an ampoule storage container used for automatically feeding a desired number of ampoules, there is known an apparatus in which a plurality of ampoules are stored in a overlying state on each other and discharged one by one by moving a movable bottom plate (Japanese Laid-open patent publication 10-192369).

However, in the aforementioned ampoule storage container, a function of changing the direction of the ampoule is not provided and a countermeasure against the jam or the like of the ampoule is not enough. In the unlikely event of the ampoule being broken, the liquid medicine is scattered and the cleaning thereafter becomes difficult. Therefore, it is necessary to reliably prevent increase of forced load on the ampoule caused by the jam of the ampoule or the like.

SUMMARY OF THE INVENTION

It is an object of the present invention to provide an ampoule storage container in which the direction of the ampoule can be changed and a desired number of ampoules can be discharged one by one in spite of simple construction.

In order to accomplish the above object, according to the present invention, there is provided an ampoule storage container for storing a plurality of ampoules in a laterally orientated state with respect to a discharge direction and discharging the ampoule one by one, the ampoule storage container comprising:

- a belt conveyor for conveying the ampoule in the laterally orientated state;
- an ampoule regulating member disposed above a belt of the belt conveyor, the ampoule regulating member forming a gap through which only one of the ampoule can pass; and
- a stopper which comes into contact with the one end of the ampoule passing through the gap so that the ampoule can be changed to a longitudinally orientated state.

According to the above construction, when the belt conveyor is driven, the ampoules put on the belt conveyor are conveyed to the ampoule regulating member. Due to the ampoule regulating member, the ampoules are regulated to enter the gap between the belt and the ampoule regulating member, whereby the ampoule is moved to the stopper reliably one by one. When the ampoule is discharged, one end of the ampoule comes into contact with the stopper, whereby the ampoule can be smoothly changed to a longitudinally orientated state.

Preferably, the ampoule storage container may further comprises a press contact member which comes into contact with the upper surface of the ampoule which is discharged passing through the gap. Thus, the press contact member can properly prevent the ampoules more than needs from being discharged when the belt conveyor is stopped.

Preferably, the belt of the belt conveyor may be formed with a plurality of protrusions in a predetermined distance so that the protrusion can engage with the ampoule to convey the ampoule to the discharge direction, whereby the protrusion passes under the ampoule when the ampoule become impossible to be conveyed. Thus, even if jam of the ampoule is caused, the protrusions can pass under the ampoule, whereby the ampoule is never damaged. Alternatively, the belt of the belt conveyor may be formed with a plurality of recesses in a predetermined distance so that the recess can engage with the ampoule to convey the ampoule to the discharge direction, whereby a belt portion between the adjacent recesses passes under the ampoule when the ampoule become impossible to be conveyed.

Preferably, the press contact member may be provided with a friction generating member for coming into contact with the ampoule to generate a friction. Thus, the ampoule can be discharged without forming above protrusions. It is also possible to prevent the ampoule from being unexpectedly discharged through the gap.

The press contact member may comprise an elastic member. Alternatively, the press contact member may be urged by an elastic member in a direction that the press contact member comes into contact with the ampoule.

Preferably, the ampoule storage container may further comprise a projection plate that comes into contact with the ampoule of the second layer positioned at a lead position in the ampoule discharge direction. The projection plate allows the lead ampoule of the second layer to be push into the first layer, whereby the ampoules can be reliably discharged without jam. It is preferable that the lower edge of the projection plate is positioned between a center line that is obtained by connecting the centers of the plurality of ampoules of the second layer and a tangential line that is obtained by connecting the outer top surfaces of the plurality of ampoules of the second layer. It is more preferable that the lower edge of the projection plate is positioned just above the center line.

Preferably, the belt conveyor may be inclined downward to the discharge direction of the ampoule. Thus, it is possible to more reliably conduct discharge of the ampoule.

BRIEF DESCRIPTION OF THE DRAWINGS

Other objects and features of the present invention will become clear from the following detail description with reference to the accompanying drawings in which.

DETAILED DESCRIPTION OF THE PREFERRED EMBODIMENTS

Figure 1:
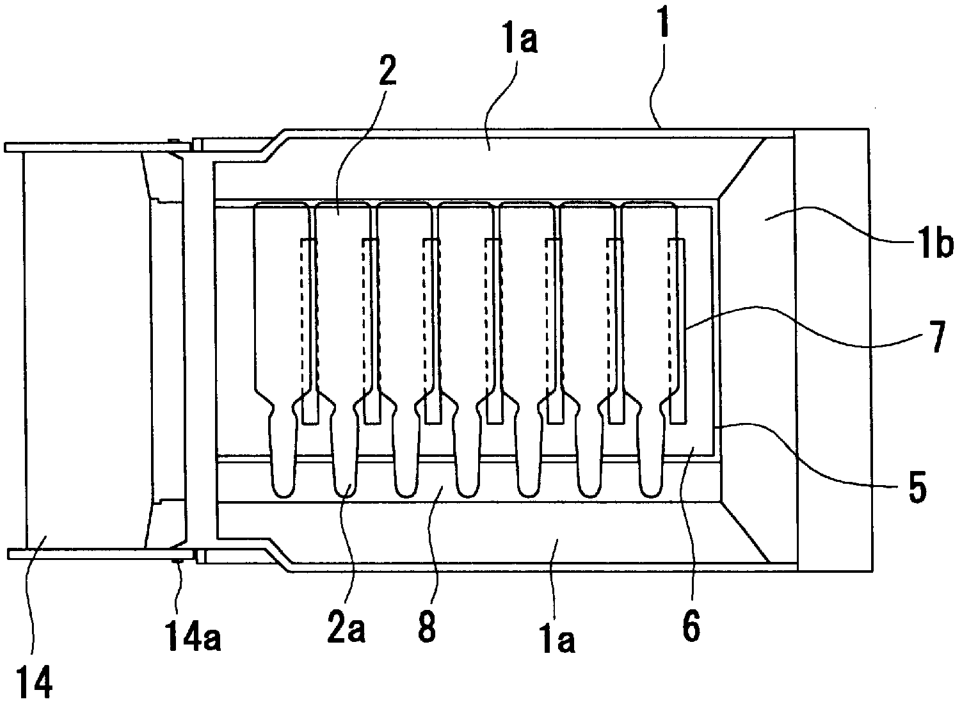
FIG. 1A is a plane view of an ampoule storage container according to an embodiment of the present invention.
FIG. 1B is a front view of the ampoule storage container of FIG. 1A.
Figure 1:
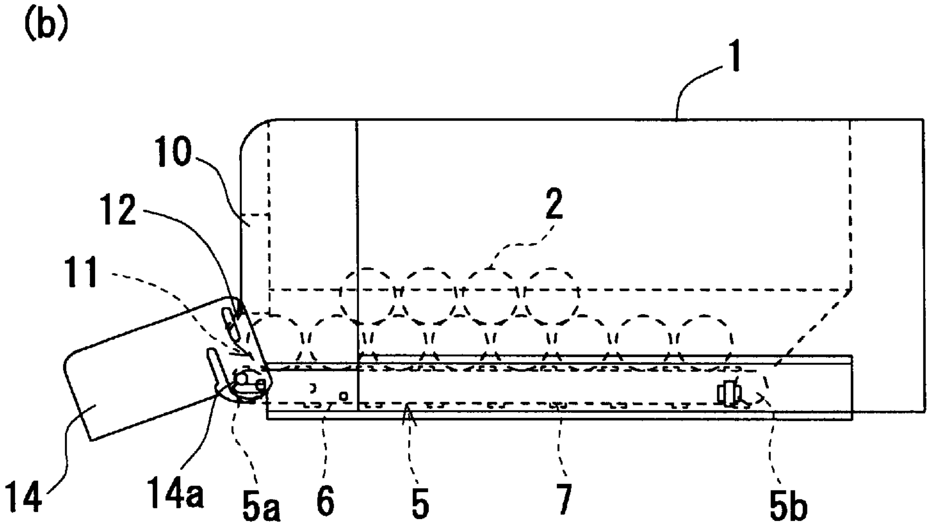
Figure 2:
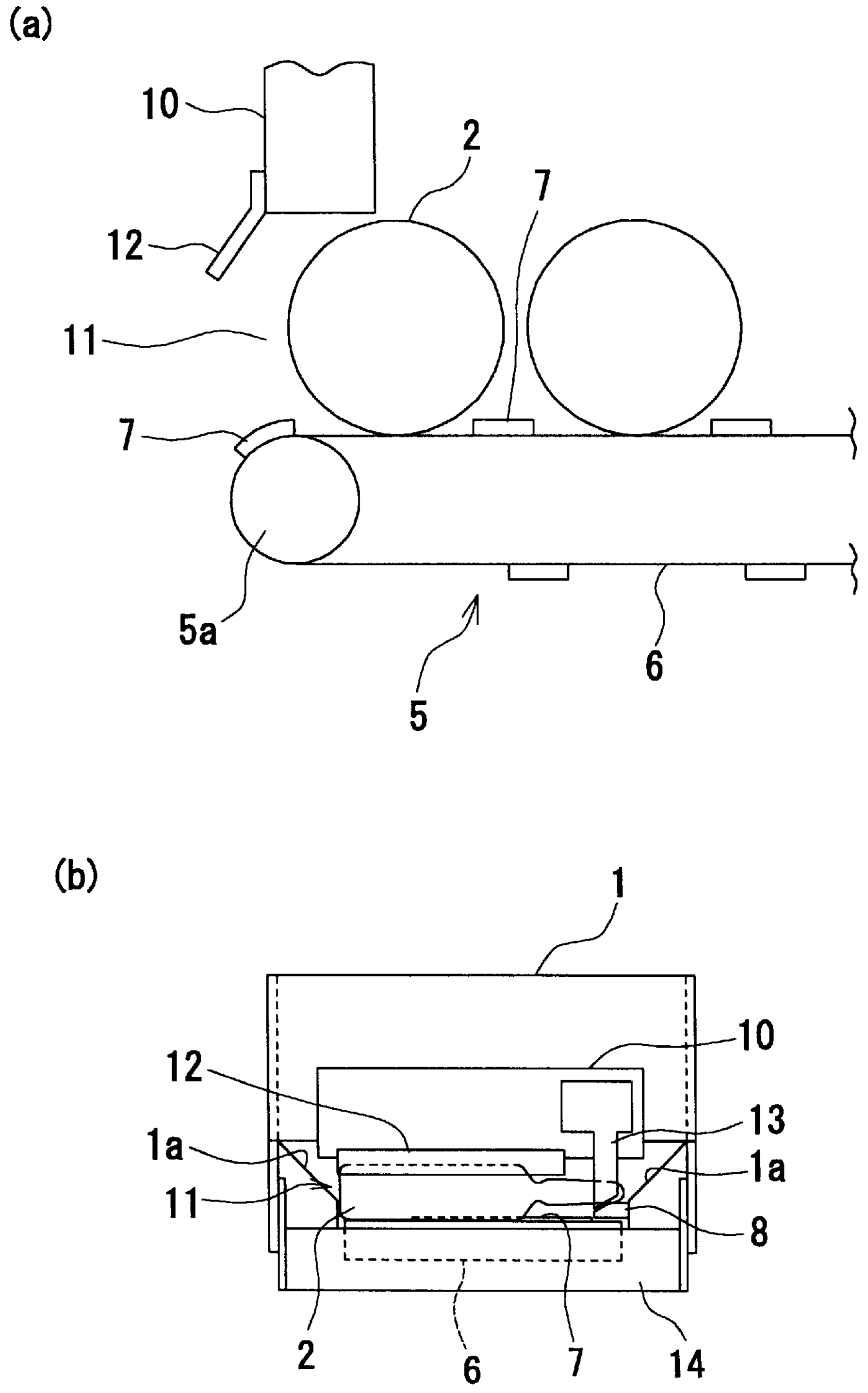
FIG. 2A is a partial enlarged view of FIG. 1B.
FIG. 2B is a left side view of the ampoule storage container of FIG. 1B.
Figure 3:
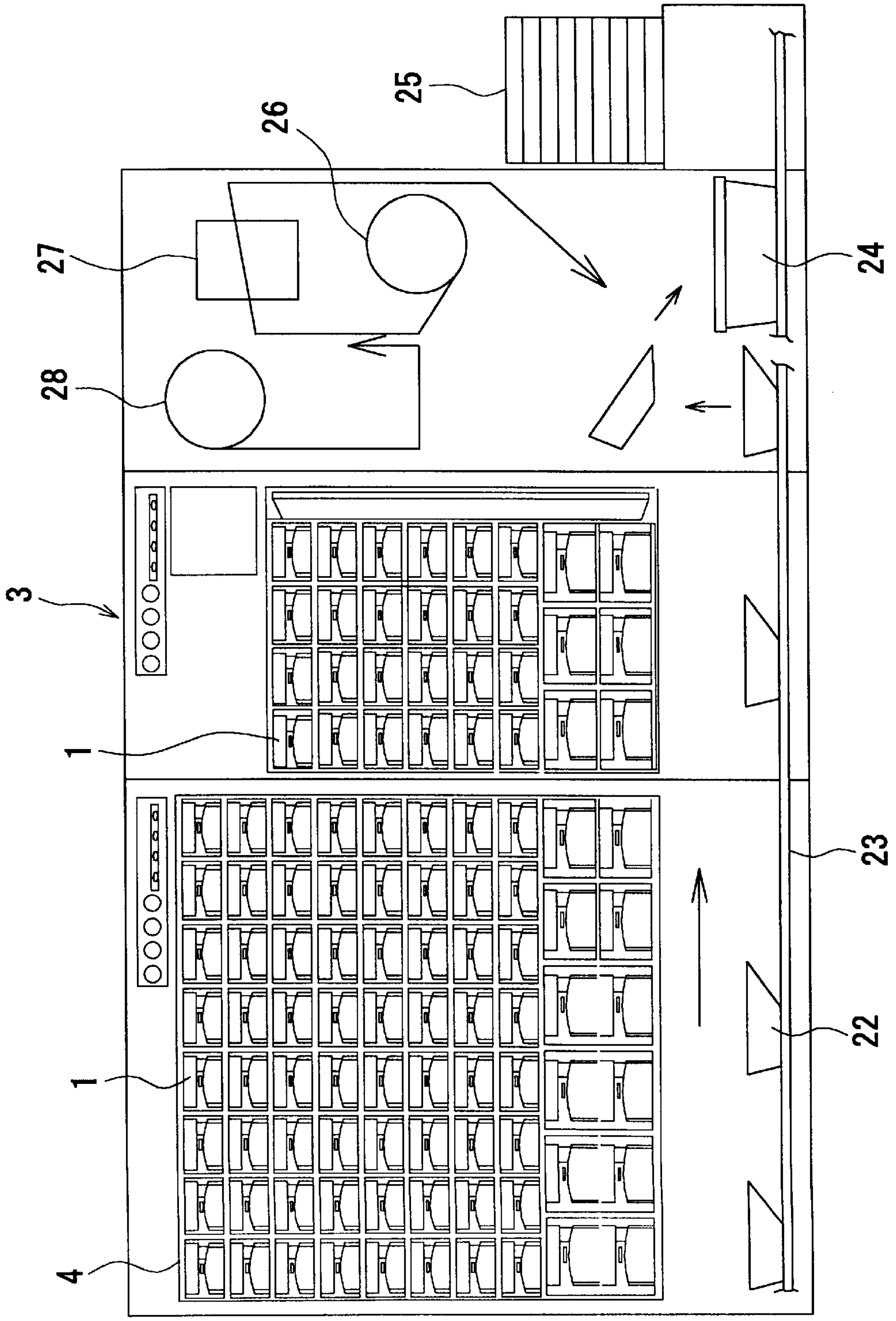
FIG. 3 is a general schematic view of a medicine feed apparatus on which the ampoule storage containers of FIG. 1 are removably mounted.
Figure 4:
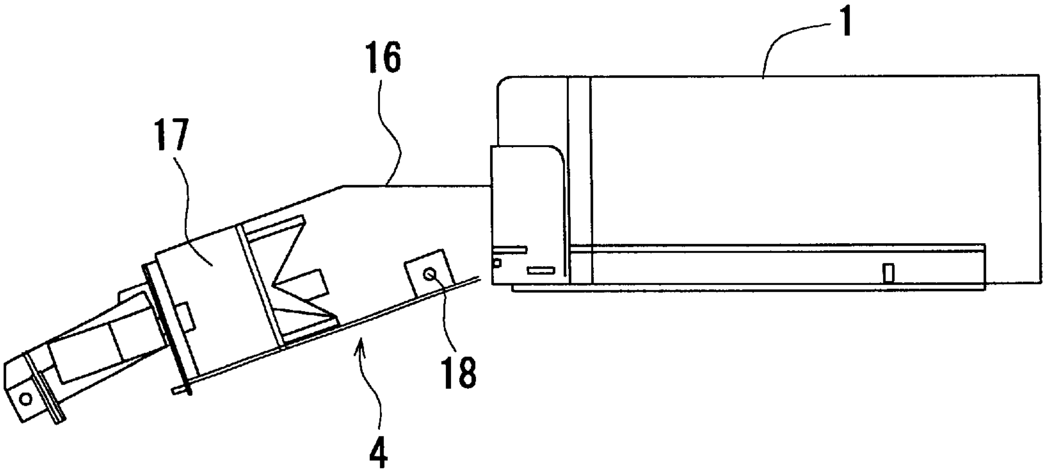
FIG. 4 is a front view of the ampoule storage container of FIG. 1 which is mounted on a medicine feed portion of the medicine feed apparatus of FIG. 3.

FIGS. 1 and 2 show an ampoule storage container 1 according to an embodiment of the present invention. The ampoule storage container 1 has a box-like shape with an upper surface opened. In the ampoule storage container 1, a plurality of ampoules 2 are stored in a laterally laid condition with respect to a discharge direction. As shown in FIG. 3, the ampoule storage container 1 is removably mounted on a plurality of medicine feed portions 4 fixed on a medicine feed apparatus 3 in a matrix-like arrangement.

In the ampoule storage container 1, the bottom central portion is provided with a belt conveyor 5. The bottom both side portions and the bottom front portion are formed with two inclined surfaces 1*a*, 1*a* and an inclined surface 1*b* respectively. A guide wall 8 for supporting a head 2*a* of the ampoule 2 is formed along the lower edge of one of the inclined surfaces 1*a*. The belt conveyor 5 has a construction that a belt 6 is supported between rotation shafts 5*a*, 5*b* disposed at both ends. The outer surface of the belt 6 is provided with a plurality of protrusions 7 disposed along a conveying direction and extended in a lateral direction. A distance between the adjacent protrusions 7 is substantially same as or more than the diameter of the ampoule 2. Each of the protrusions 7 has such a height that the protrusion 7 can engage with the ampoule 2 to move it in a state orientated in a lateral direction and also can pass under the ampoule 7 before the ampoule 2 is damaged due to an external force that inhibits the ampoule 2 from being moved.

At the rear end surface of the ampoule storage container 1 is disposed an ampoule regulating member 10. The ampoule regulating member 10 forms an ampoule passage 11 having a gap, between the belt 6 of the belt conveyor 5 and the ampoule regulating member 10, that allows only one ampoule 2 to pass through. The ampoule regulating member 10 is provided with a press contact member 12 and a stopper 13 as shown in FIG. 2B. The press contact member 12 is made of synthetic resin, rubber and so on and has a plate-like shape (a film-like shape and a protruding shape are also permissible) that protrudes downward obliquely in a discharge direction of the ampoule 2. The press contact member 12 comes into press contact with the outer surface of the ampoule 2, preventing the ampoule 2 from being unexpectedly discharged through the ampoule passage 11 when the belt conveyor 5 is stopped. The stopper 13 is disposed on one side of the ampoule passage 11 and has a plate-like shape. The stopper 13 comes into contact with the head 2*a* of the ampoule 2, allowing the ampoule 2 conveyed by the belt conveyor 5 to turn and orient in a longitudinal direction. In the vicinity of the ampoule regulating member 10, a door 14 which can cover the lower half portion of the rear end surface of the ampoule storage container 1 is provided pivotably around a support shaft 14*a*. The door 14 is urged by a spring not shown in a closing direction.

The medicine feed portion 4 is provided with a medicine feed container 16 and a rotor 17 disposed in the medicine feed container 16.

The medicine feed container 16 has a box-like shape with an upper surface opened and is inclined downward in the discharge direction of the ampoule storage container 1. The ampoule 2 discharged in the medicine feed container 16 is detected by an ampoule detecting sensor 18 provided on one side wall. The rotor 17 has a substantially cylindrical shape and the outer surface of the rotor 17 is formed with a plurality of ampoule holding recesses (not shown). The detail of the rotor 17 is disclosed in, for example, Japanese Laid-open patent publication No. HEI8-208024 and Japanese utility model No. 2539005, the teachings of which are hereby incorporated by reference.

Operation of the medicine feed apparatus 3 will be explained hereinafter.

In an ampoule feed process, it is decided by a sensor not shown whether or not the ampoule 2 is present in the ampoule holding recess of the rotor 17 stopped at the predetermined position. If the ampoule 2 is detected in the ampoule holding recess, the rotor 17 is rotated to feed the ampoule 2. If the ampoule 2 is not detected, it is decided whether or not the ampoule 2 is present in the medicine feed container 16 based on a detection signal of the ampoule detecting sensor 18.

If the ampoule 2 is detected in the medicine feed container 16, the rotor 17 is rotated to hold the ampoule 2 into the ampoule holding recess and then feed it.

On the other hand, if the ampoule 2 is not detected, the belt conveyor 5 is driven forwardly for 5 minutes and reversely for 1 minute. This operation is repeated. The ampoule 2 in the ampoule storage container 1 is conveyed to the medicine feed container 16. The protrusions 7 formed on the belt 6 allows the ampoule 2 to be conveyed in a state orientated in the lateral direction. The ampoule regulating member 10 allows only the ampoule 2 directly put on the belt 6 to pass through the ampoule passage 11. At the outlet of the ampoule passage 11, the head 2*a* of the ampoule 2 comes into contact with the stopper 13 so that the ampoule 2 continues to move as it turns. Then, the ampoule 2 turns by about 90 degrees, whereby the ampoule 2 is discharged into the medicine feed container 16 in a state orientated in the longitudinal direction.

Thus, in spite of a simple construction comprising the ampoule regulating member 10, the press contact member 12 and the stopper 13, the orientation of the ampoule 2 can be easily changed from the lateral direction to the longitudinal direction. The ampoule regulating member 10 allows only the ampoule 2 directly put on the belt 6 to move in the discharge direction and the press contact member 12 prevents the ampoule 2 from unexpectedly discharged, whereby a predetermined number of ampoules 2 can be reliably discharged. In addition, since the ampoule 2 can be turned by the stopper 13 as it is pressed by the press contact member 12, the orientation of the ampoule 2 can be accurately changed from the lateral direction to the longitudinal direction.

By the way, even if a forced load is applied on the ampoule 2 to be discharged through the ampoule passage 11 due to the fact, for example, that the ampoules 2 stacked on the ampoule 2 to be discharged are skewed, the protrusions 7 pass under the ampoule 2, in other ward, the ampoule 2 overpass the protrusions 7 (the protrusions 7 themselves are compressed), whereby the ampoule 2 is never damaged.

The ampoule 2 discharged into the medicine feed container 16 is detected by the ampoule detecting sensor 18. After the ampoule 2 is detected by the sensor 18, the belt conveyor 5 is stopped. When the ampoule 2 in the rotor 17 is discharged, the belt conveyor 5 is driven again in the same drive cycle.

Same operation is repeated in the same manner until a desired number of ampoules 2 are discharged. When the desired number of ampoules 2 are discharged, the belt conveyor 6 is stopped. Since the ampoule 2 adjacent to the ampoule passage 11 is prevented from being unexpectedly discharged, a surplus ampoule 2 is never discharged due to the stop of the belt conveyor 5.

The desired number of ampoules 2 discharged from the rotor 17 of the medicine feed container 16 is dropped into a tray 22 on a belt conveyor 23 disposed at a bottom portion of the medicine feed apparatus 3 by a lifter (not shown) disposed behind the medicine feed portion 4 in the medicine feed apparatus 3. The tray 22 is conveyed on the belt conveyor 23 while similarly receiving other medicines from each medicine feed portion 4. The medicine in the tray 22 is housed in a bucket 24 fed from a bucket stacker 25. An envelope, which is fed from an envelope roll 26 and on which a patient name and the like are printed by a printer 27, and a sheet of paper, which is fed from a paper roll 28 and on which prescription information is printed by the printer 27, are also housed in the bucket 24. The bucket 24 housing the medicine, envelope and paper is dispensed to the outside of the medicine feed apparatus 3.

In the case that the ampoule 2 is not detected for 30 minutes by the sensor 18 in spite of conducting the above operation, it is decided and indicated that the ampoule 2 is lacking. The operator, in accordance with the indication, removes the ampoule storage container 1 from the medicine feed portion 4 of the medicine feed apparatus 3. The ampoule 2 positioned in the vicinity of the door 14 of the ampoule storage container 1 never drop out because the press contact member 12 comes into contact with the ampoule 2. Therefore, when the ampoule storage container 1 is removed, the door 14 is not prevented from being pivoted, allowing the door 14 to be smoothly closed.

In the case that the rotor 17 causes the defects of rotation due to the jam of the ampoule 2 or the like during the feeding operation of the ampoule 2, the rotor 17 is once driven reversely for a predetermined time and then driven forwardly. Thus, it is possible to promptly resolve the jam of the ampoule 2 or the like and to retrieve normal feed condition. If the defects of rotation is not resolved in spite of reverse rotation of the rotor 17, an error may be indicated and the apparatus may be stopped.

In the aforementioned embodiment, although the stopper 13 is fixed on the ampoule regulating member 10 so that the orientation of the ampoule 2 is changed just after passing through the ampoule passage 11, it is also possible to provide a protrusion such as a pin on the door 4 so that the orientation of the ampoule 2 is changed just before reaching the rotor 17.

Figure 5:
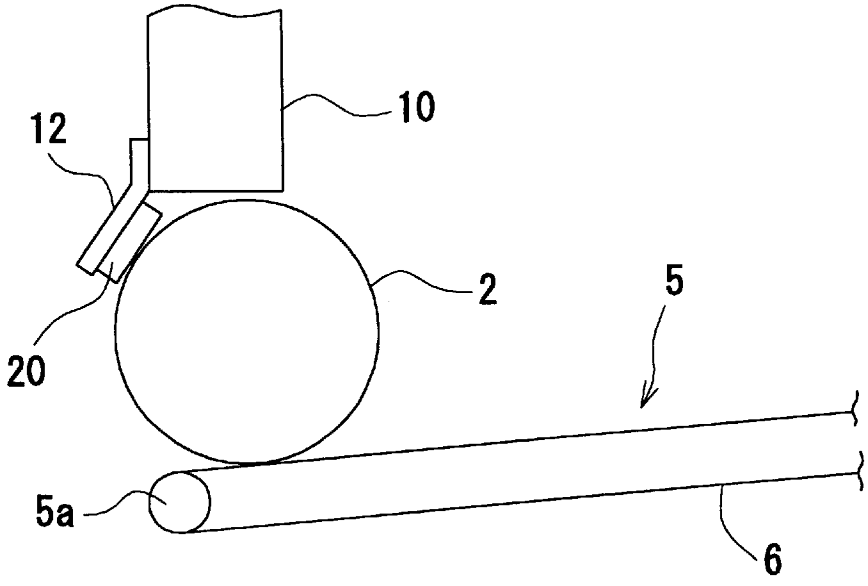
FIG. 5 is a partial enlarged view of an ampoule storage container of an another embodiment of the present invention.

In addition, in the aforementioned embodiment, although the press contact member 12 is provided on the ampoule regulating member 10, it may be possible to adopt a construction as shown in FIG. 5.

That is to say, a friction generating member 20 is provided on the lower surface of the tip end portion of the press contact member 12. As the friction generating member 20, urethane rubber (polyurethane), nitrile rubber (butadiene acrylonitrile copolymer), silicon rubber (inorganic polysiloxane), cork, felt or the like can be used. In stead of press contact member 12 a friction generating member may be provided. Preferably, the belt conveyor 5 is inclined downward in a discharge direction of the ampoule 2.

According to the above construction, when the belt conveyor 5 is driven, the ampoule 2 is conveyed in the discharge direction due to the friction between the belt conveyor and the ampoule 2 and discharged as the press contact member 12 is elastically deformed. At this time, since the ampoule 2 is pinched between the friction generating member 20 and the belt conveyor 5, it is never caused that the ampoule 2 slips and is not discharged even if the ampoules 2 in the ampoule storage container 1 become shortage. More specifically, if the friction generating member 20 is not provided as shown in FIG. 5, the ampoule 2 rotates in a clockwise direction in FIG. 5 due to the slip between the press contact member 12 and the ampoule 2, disenabling the ampoule 2 to be discharged. However, this is prevented by the friction generating member 20 and the ampoule 2 is reliably discharged.

Providing the friction generating member 20 prevents the ampoule 2 from being unexpectedly discharged through the ampoule passage 11 when the belt conveyor 5 is stopped and also enables the ampoule 2 to be reliably discharged. The presence of the friction generating member 20 enables the ampoule 2 to be reliably discharged without providing the protrusions 7 on the surface of the belt conveyor 5. Therefore, it is possible to prevent the lifetime of the belt conveyor 5 from becoming shorter due to the detachment of the protrusions 7 or the like. Moreover, since the protrusions 7 are not necessary, the diameter of the rotation shafts **5*a*, 5*b* between which the belt 6 is supported can be reduced, enabling to reduce the size (in a vertical direction) of the ampoule storage container 1**.

Figure 6:
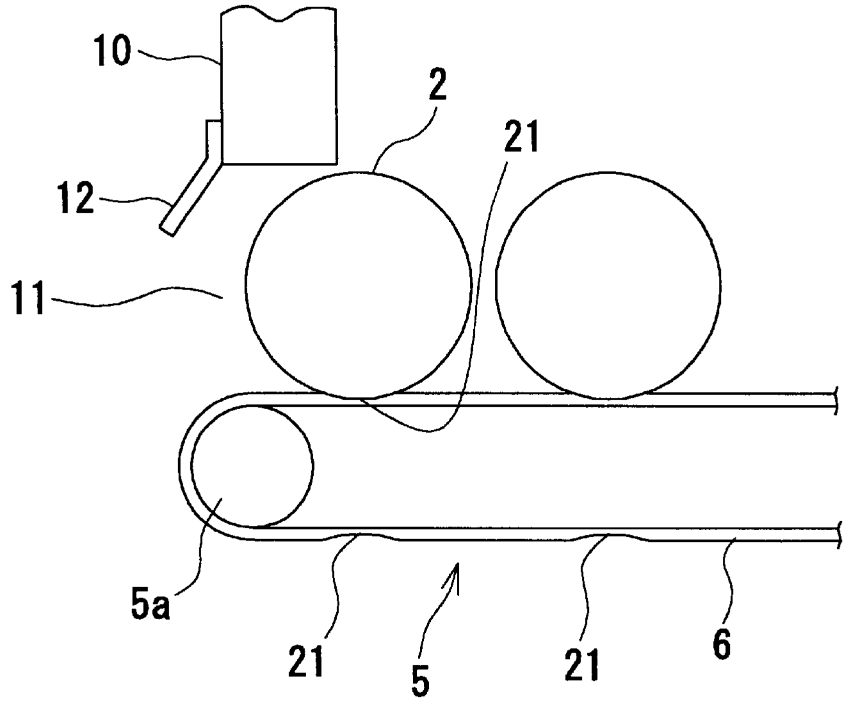
FIG. 6 is a partial enlarged view of an ampoule storage container of a still another embodiment of the present invention.

In addition, although the protrusions 7 are provided on the belt 6 of the belt conveyor 5 in the aforementioned embodiment, as shown in FIG. 6, a plurality of recesses 21 may be provided on the surface of the belt 6 of the belt conveyor 5 at a predetermined interval in a longitudinal direction of the belt 6. Each recess 21 extends in a lateral direction of the belt 6, allowing the ampoule 2 to be engaged with the recess 21 and conveyed in a state orientated in the lateral direction. When the jam of the ampoule 2 or the like is caused, belt portions between the adjacent recesses 21 pass under the ampoule 2, whereby the ampoule 2 is never damaged.

Figure 7:
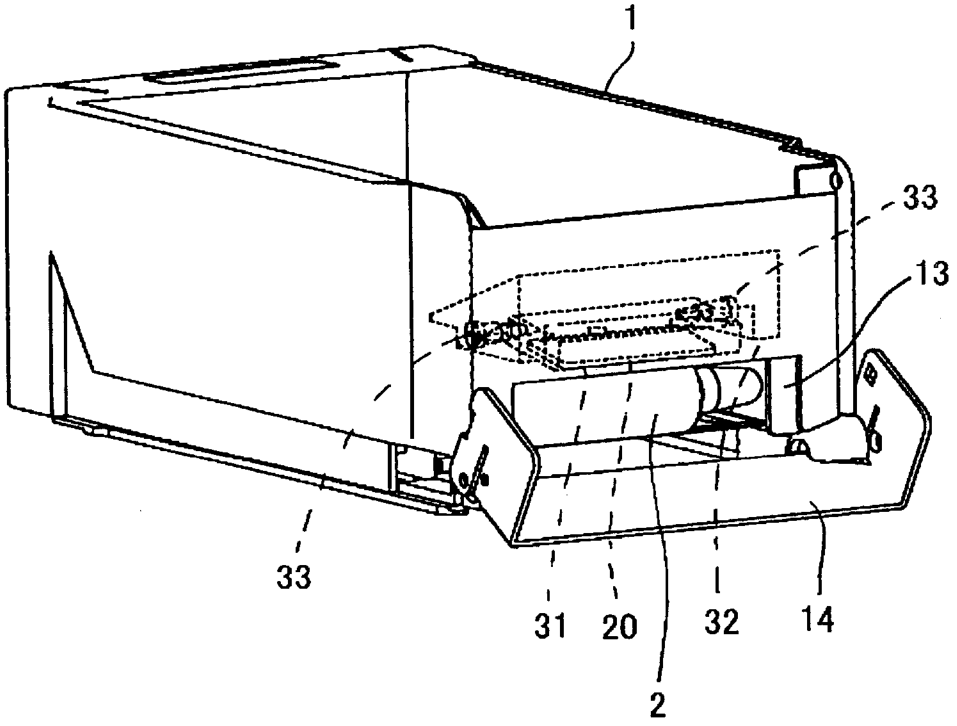
FIG. 7 is a perspective view of an ampoule storage container according to a still another embodiment of the present invention.
Figure 8:
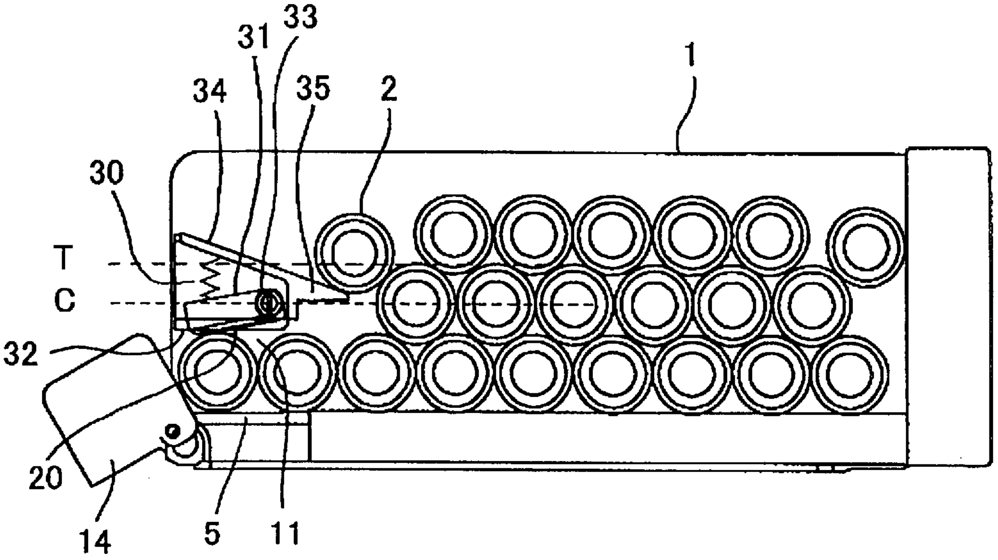
FIG. 8 is a sectional view of the ampoule storage container of FIG. 7.

Moreover, in the above mentioned embodiment, although the elastic member itself is used as the press contact member, a press contact member 31 which is urged by an elastic member 30 in a direction that the press contact member 31 comes into press contact with the ampoule 2 may be used as shown in FIGS. 7 and 8. In this embodiment, an ampoule regulating member 32 of shelf-like shape is provided on the rear end surface of the ampoule storage container 1 so as to protrude inwardly. On the lower surface of the ampoule regulating member 32, a press contact member 31 of plate-like shape is pivotably provided by means of pins 33 fixed at the upstream end of the press contact member 31 with respect to the ampoule discharge direction. The press contact member 31 is urged by the elastic member 30 comprising a spring in a direction that the press contact member 31 comes into press contact with the ampoule 2. On the lower surface of the press contact member 31 is attached the friction generating member 20 as described above with reference to FIG. 5. operation of the press contact member 31 and the friction generating member 20 during discharge of the ampoule 2 is same as that of the aforementioned embodiment and therefore the explanation thereof will be omitted.

Figure 9:
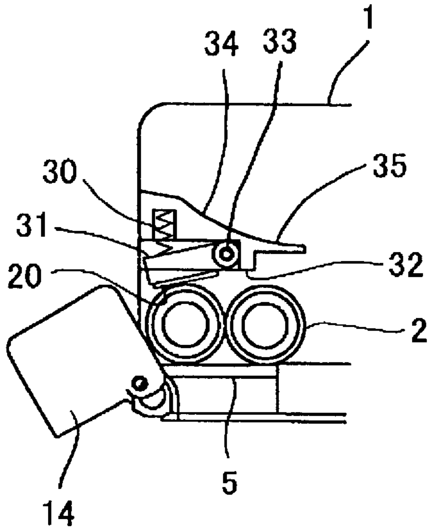
FIG. 9 is a partial sectional view of a modification of the ampoule storage container of FIG. 8.

Between the lower surface of the ampoule regulating member 32 and the belt conveyor 5 is formed a ampoule passage 11 having a gap through which one ampoule 2 can pass. The upper surface of the ampoule regulating member 32 is formed with an inclined surface 34 that is inclined downward in an opposite direction to the discharge direction of the ampoule 2. The lower end of the inclined surface 34 comprises a projection plate 35 that projects in the opposite direction to the ampoule discharge direction. The lower edge of the projection plate 35 is positioned between a center line C that is obtained by connecting the centers of the plurality of ampoules 2 of the second layer and a tangential line T that is obtained by connecting the outer top surfaces of the plurality of ampoules 2 of the second layer, preferably just above the center line C. If the upper edge of the projection plate 35 is positioned at higher level, The ampoule 2 is broken when the ampoule 2 rolling down along the inclined surface 34 dropped to the belt conveyor. Therefore, the upper edge of the projection plate 35 is preferably positioned at as low level as possible. Moreover, the inclined surface of the ampoule regulating member 34 may be curved as shown in FIG. 9.

Figure 10:
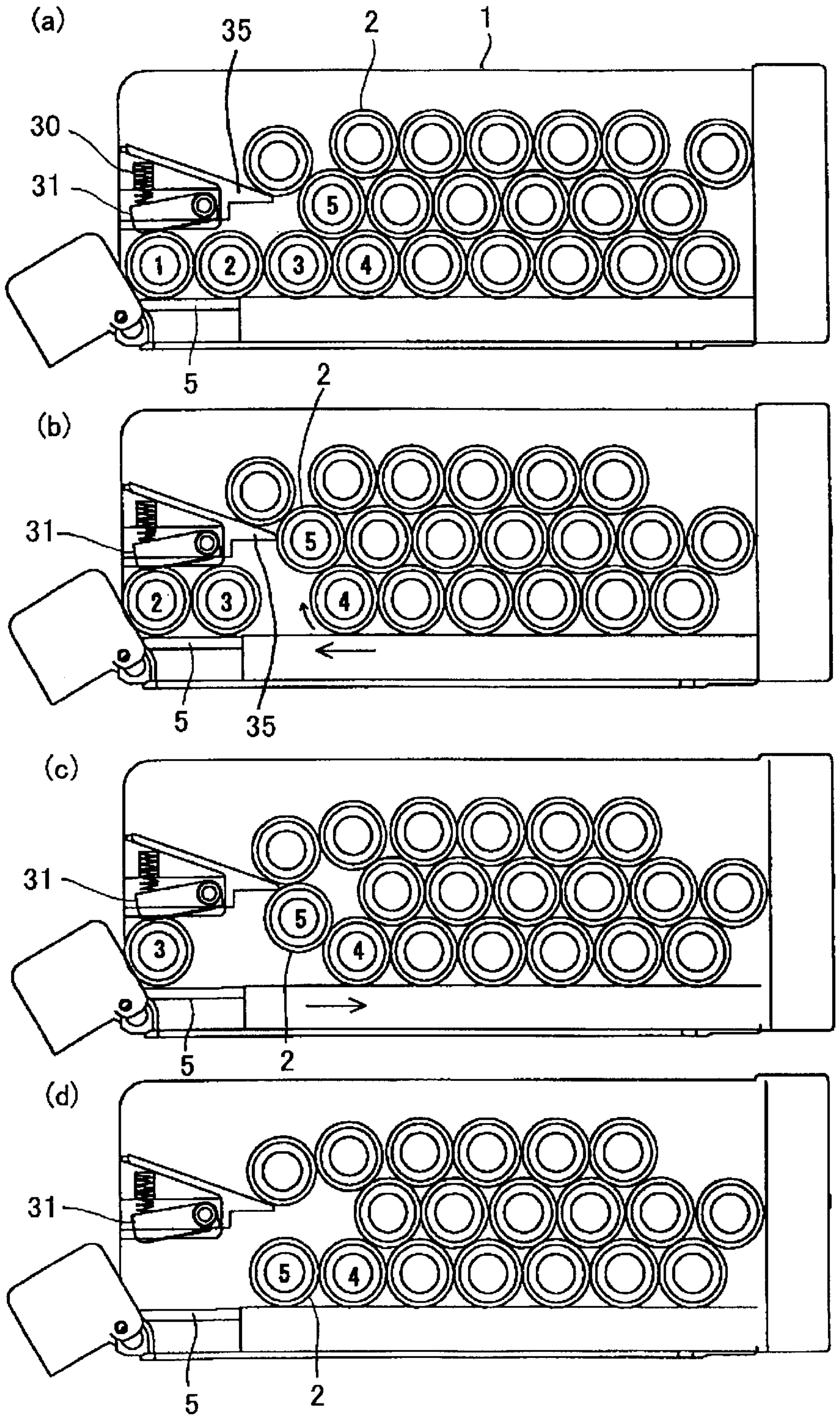
FIGS. 10(*a*)–10(*d*) are sectional views of the ampoule storage container continuously showing ampoule discharge operations.

According to the construction above, as shown in FIG. 10(*a*), when the first layer of the ampoules 2 are conveyed by the belt conveyor 5 in the ampoule discharge direction (a left side direction in the Figure), the first layer of the ampoules 2 are also moved in the same direction. Then, as shown in FIG. 10(*b*), No. 5 ampoule 2 at the lead position of the second layer comes into contact with the projection plate 35 of the lower end of the inclined surface 34, which allows No. 5 ampoule 2 to be pressed downward and push into a space between No. 3 and No. 4 ampoules 2 of the first layer. At this time, as shown in FIG. 10(*c*), even if No. 5 ampoule 2 is jammed between the projection plate 35 and the ampoule 2 of the first layer, because the belt conveyor 5 repeats the forward drive for 5 minutes and the reverse drive for 1 minute, the No. 5 ampoule 2 drops to the belt conveyor 5 as shown in FIG. 10(*d*) at the time of the reverse drive of the belt conveyor 5. Into this vacant space in the second layer enters the ampoule 2 rolling down along the inclined surface 34 or the ampoule 2 of third layer. Thus, the ampoules 2 are reliably discharged without jam.

As it is clear from the above description, according to the present invention, the ampoule regulating member allows only the ampoules directly put on the belt to be conveyed. Since the stopper allows the ampoule to change its orientation, the direction of the ampoule can be changed in spite of simple construction.

Although the present invention has been fully described by way of the examples with reference to the accompanying drawing, it is to be noted that various changes and modifications will be apparent to those skilled in the art. Therefore, unless such changes and modifications otherwise depart from the spirit and scope of the present invention, they should be construed as being included therein.

What is claimed is:

1. An ampoule storage container for storing a plurality of ampoules in a laterally orientated state with respect to a discharge direction and discharging the ampoule one by one, the ampoule storage container comprising:

a belt conveyor for conveying the ampoule in the laterally orientated state;

an ampoule regulating member disposed above a belt of the belt conveyor, the ampoule regulating member forming a gap through which only one of the ampoule can pass; and a stopper which comes into contact with the one end of the ampoule passing through the gap so that the ampoule can be changed to a longitudinally orientated state.

2. The ampoule storage container as in claim 1, wherein further comprising:

a press contact member which comes into contact with the upper surface of the ampoule which is discharged passing through the gap.

3. The ampoule storage container as in claim 1, wherein the belt of the belt conveyor is formed with a plurality of protrusions in a predetermined distance so that the protrusion can engage with the ampoule to convey the ampoule to the discharge direction, whereby the protrusion passes under the ampoule when the ampoule become impossible to be conveyed.

4. The ampoule storage container as in claim 1, wherein the belt of the belt conveyor is formed with a plurality of recesses in a predetermined distance so that the recess can engage with the ampoule to convey the ampoule to the discharge direction, whereby a belt portion between the adjacent recesses passes under the ampoule when the ampoule become impossible to be conveyed.

5. The ampoule storage container as in claim 2, wherein the press contact member is provided with a friction generating member for coming into contact with the ampoule to generate a friction.

6. The ampoule storage container as in claim 2, wherein the press contact member comprises an elastic member.

7. The ampoule storage container as in claim 2, wherein the press contact member is urged by an elastic member in a direction that the press contact member comes into contact with the ampoule.

8. The ampoule storage container as in claim 1, further comprising a projection plate that comes into contact with the ampoule of the second layer positioned at a lead position in the ampoule discharge direction.

9. The ampoule storage container as in claim 1, wherein the lower edge of the projection plate is positioned between a center line that is obtained by connecting the centers of the plurality of ampoules of the second layer and a tangential line that is obtained by connecting the outer top surfaces of the plurality of ampoules of the second layer.

10. The ampoule storage container as in claim 8, wherein the lower edge of the projection plate is positioned just above the center line.

11. The ampoule storage container as in claim 1, wherein the belt conveyor is inclined downward to the discharge direction of the ampoule.

* * * * *